(12) United States Patent
Suh et al.

(10) Patent No.: US 12,460,938 B2
(45) Date of Patent: Nov. 4, 2025

(54) ROUTE PROVIDING METHOD AND APPARATUS FOR POSTPONING ARRIVAL OF A VEHICLE AT A DESTINATION

(71) Applicants: HYUNDAI MOTOR COMPANY, Seoul (KR); KIA CORPORATION, Seoul (KR)

(72) Inventors: Jung Seok Suh, Yongin-si (KR); Hae Seong Jeong, Busan (KR); Mi Jin Chung, Seoul (KR); Ja Yoon Goo, Anyang-si (KR); Hong Gyu Lee, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 252 days.

(21) Appl. No.: 18/121,445

(22) Filed: Mar. 14, 2023

(65) Prior Publication Data

US 2024/0142249 A1 May 2, 2024

(30) Foreign Application Priority Data

Oct. 28, 2022 (KR) .................. 10-2022-0141645

(51) Int. Cl.
*G01C 21/34* (2006.01)
*B60W 40/09* (2012.01)

(52) U.S. Cl.
CPC ......... *G01C 21/3476* (2013.01); *B60W 40/09* (2013.01); *G01C 21/3407* (2013.01); *B60W 2540/21* (2020.02); *B60W 2540/223* (2020.02); *B60W 2540/225* (2020.02)

(58) Field of Classification Search
CPC ............. B60W 60/0021; B60W 40/08; G01C 21/3415; G01C 21/3438; G01C 21/3484; G01C 21/36; G01C 21/3617; G01C 21/3605; G01C 21/34; G01C 21/3407; G06Q 10/025; G06Q 10/109
See application file for complete search history.

(56) References Cited

U.S. PATENT DOCUMENTS

| | | | |
|---|---|---|---|
| 10,001,379 B2 * | 6/2018 | Barker | G06F 16/23 |
| 2009/0157297 A1 * | 6/2009 | Hagiwara | G01C 21/3614 701/418 |
| 2020/0378778 A1 * | 12/2020 | Glazberg | G05D 1/0088 |

* cited by examiner

*Primary Examiner* — Scott A Browne
*Assistant Examiner* — Jisun Choi
(74) *Attorney, Agent, or Firm* — Lempia Summerfield Katz LLC

(57) ABSTRACT

A computer implemented method and apparatus provide a route to postpone or delay arrival of a vehicle at a destination. The method includes: obtaining, by a processor, behavior information indicating a behavior of an occupant in the vehicle; receiving, by the processor from the occupant, time information for postponing arrival of the vehicle at the destination; and providing, by the processor, at least one recommended route according to the behavior information and the time information.

17 Claims, 7 Drawing Sheets

There are still "25 minutes" remaining of content you are watching.
Do you want to extend the driving time to your destination?

| 5 minutes | 25 minutes (recommended) | Direct input |

FIG. 3

| Additional time / Occupant behavior | Short time (less than +20 minutes) | Long time (20 minutes or more) |
|---|---|---|
| Vehicle forward or lateral gaze | Urban area | Suburban area |
| Vehicle display gaze | Urban area, free stop point | Suburban area, suburban driving, restaurant point, paid stop point |
| Occupant terminal gaze | Urban area, free stop point | Suburban area, charging station point |
| Book reading | Free stop point | Paid stop point, charging station point |
| Conversation | Urban area, free stop point | Suburban area, paid stop point, charging station point |
| Sleeping | Free stop point | Suburban area, paid stop point, charging station point |
| ... | ... | ... |

FIG. 4

ROUTE PROVIDING METHOD AND APPARATUS FOR POSTPONING ARRIVAL OF A VEHICLE AT A DESTINATION

CROSS REFERENCE TO RELATED APPLICATION

The present application is based on and claims the benefit of priority to Korean Patent Application Number 10-2022-0141645, filed on Oct. 28, 2022 in the Korean Intellectual Property Office, the entire disclosure of which is incorporated herein by reference.

BACKGROUND

The description below merely provides background information related to the present embodiments and does not constitute prior art.

The development of technologies of driving assist for providing driving comfort and ensuring the safety of a driver and autonomous driving that enables a vehicle to drive autonomously on a road without driver intervention have been accelerating.

Regarding the autonomous driving technology, there is an essential need for a navigation device that guides a driving route of a vehicle. Regarding conventional vehicles, a current location of a vehicle is estimated using a navigation device. Further, destination information is received from an occupant and a route is established between the current location and the destination of the vehicle. Further, the vehicle moves, i.e., is driven, using the established route. The vehicle is controlled by an autonomous system or driver.

Regarding conventional vehicles, routes are simply set or restricted based on the efficient movement of a vehicle. For example, the vehicle sets either a route having the shortest distance or a route requiring the least cost from routes to a destination as a driving route. In other words, the aim of conventional vehicles is limited to providing efficient movement.

SUMMARY

According to an aspect of the present disclosure, a route providing method is configured to postpone arrival of a vehicle at a destination. Specifically, a route providing method as well as a computer implemented method and apparatus provide a route to postpone arrival of a vehicle at a destination. The route providing method includes: obtaining, by a processor, behavior information indicating a behavior of an occupant in the vehicle; receiving, by the processor from the occupant, time information for postponing arrival of a vehicle at a destination; and providing, by the processor, at least one recommended route according to the behavior information and the time information.

According to another aspect of this embodiment, a route providing apparatus is configured to postpone arrival of a vehicle at a destination. The apparatus includes at least one memory storing computer-executable instructions and at least one processor. The at least one processor is configured to execute the computer-executable instructions to obtain behavior information indicating a behavior of an occupant in the vehicle, receive, from the occupant, time information for postponing arrival of the vehicle at the destination, and provide at least one recommended route based on the behavior information and the time information.

BRIEF DESCRIPTION OF THE DRAWINGS

The above and other aspects, features, and advantages of certain embodiments of the disclosure should be more apparent from the following description taken in conjunction with the accompanying drawings, in which:

FIG. 3 is a view showing a time information input request screen according to an embodiment of the present disclosure;

FIG. 4 is a view of a table in which locations corresponding to a delay time and a rider behavior are recorded according to an embodiment of the present disclosure.

DETAILED DESCRIPTION

Figure 1:
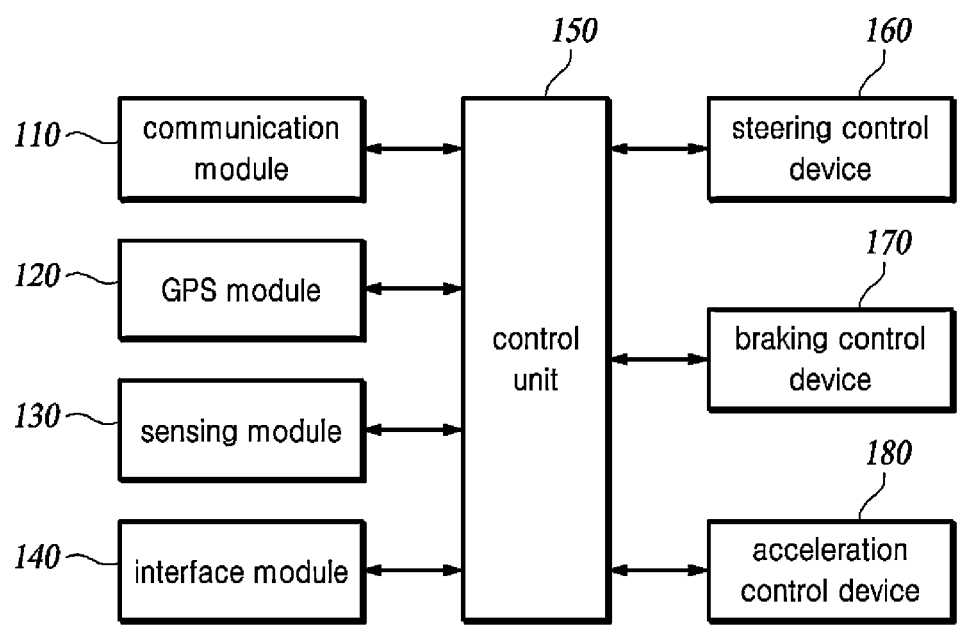
FIG. 1 is a configuration diagram of a route providing apparatus according to an embodiment of the present disclosure.

Embodiments of the present disclosure relate to a routing method and device for extending the time of arrival of a vehicle.

The aim, i.e., the goal of the disclosed embodiments includes enabling a vehicle that is equipped with an autonomous driving system to not only provide efficient movement but also to provide a specific user experience for an occupant in the vehicle. Thus, the disclosed embodiments provide a practical application and a solution to a technical problem of enabling an occupant to perform various tasks within the vehicle, for example, while it is being driven.

Therefore, the disclosed embodiments enable vehicles to provide an environment which enables the occupant to perform a task in. In particular, when a driver is absent, such as in a robotaxi, the disclosed embodiments solve a technical need by providing a human-machine interface by which it is possible to improve the user experience of the occupant.

Embodiments of the present disclosure provide a route providing method and device for improving a user experience by postponing the arrival of a vehicle at a destination so that an occupant's behavior can be maintained when the vehicle arrives to a location near a destination.

The problems that the present disclosure solve are not limited to the above-mentioned problems. Other problems not mentioned should be clearly understood by those of ordinary skill in the art from the description below.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element in the written description and claims is described as being "for" performing or carry out a stated function, step, set of instructions, or the like, the element may also be considered as being "configured to" do so.

Each component of a device or method according to the present disclosure may be implemented in hardware or software, or in a combination of hardware and software. In addition, the functions of each component may be implemented in software. A microprocessor or processor may execute functions of the software corresponding to each component.

FIG. 1 is a configuration diagram of a route providing apparatus according to an embodiment of the present disclosure.

Referring to FIG. 1, the route providing apparatus includes a control unit 150. The route providing apparatus may further include at least one of a communication module 110, a global positioning system (GPS) module 120, a sensing module 130, an interface module 140, a steering control device 160, a braking control device 170, or an acceleration control device 180. The route providing apparatus may further include a storage unit for storing information for providing a route to an occupant. Further, the route providing apparatus is provided in a vehicle (not shown).

The communication module 110 performs communication with a server, a terminal device of an occupant, or other vehicles.

When the vehicle is equipped with an audio, video, navigation (AVN) device, the communication module 110 may request or receive information regarding media content provided by the AVN device from a server providing media content. The communication module 110 may request, from an occupant's terminal device, operational information or status information of the occupant's terminal device that may be used to estimate or determine a behavior of the occupant.

The communication module 110 may receive information from other vehicles or transmit information to other vehicles via communication with a server. In another example, the communication module 110 may receive road information, traffic information, weather information, and the like from an external server.

The communication module 110 may include an internal communication unit and an external communication unit.

The internal communication unit may perform transmission or reception using various communication protocols present in a vehicle. In this embodiment, the communication protocol may include at least one of a Controller Area Network (CAN), CAN with Flexible Data Rate (CAN FD), an Ethernet, a Local Interconnect Network (LIN), and/or a FlexRay. The communication protocol may include other protocols for communication between various devices onboard a vehicle.

The external communication unit may use various communication technologies such as a vehicular ad hoc network (VANET) communication technology, a wireless access in vehicular environments (WAVE) communication technology, a dedicated short range communication (DSRC) technology, a communication access in land mobile (CALM) communication technology, a vehicle-to-vehicle (V2V) communication technology, a vehicle-to-infrastructure (V2I) communication technology, a vehicle-to-network (V2N) communication technology, a wireless LAN (WLAN) communication technology, a Wireless-Fidelity (Wi-Fi) communication technology, a long term evolution (LTE) communication technology, a long term evolution-advanced (LTE-A) communication technology, a 5G communication technology, a 6G communication technology, an ultra wideband (UWB) communication technology, a Zig-Bee communication technology and a near field communication (NFC) technology.

The communication module 110 may include at least one of a transmission antenna, a reception antenna, a radio frequency (RF) circuit capable of implementing various communication protocols, a transceiver, and/or an RF element.

The GPS module 120 receives GPS information of a vehicle equipped with a route providing apparatus. The control unit 150 may accurately determine the current location of a vehicle based on GPS information received by the GPS module 120. The GPS information may be used to estimate at least one among a location, a direction, a speed, an acceleration, an expected route, or a route history of a vehicle.

The sensing module 130 includes at least one sensor for collecting internal or external information of a vehicle. The sensing module 130 may include at least one among a camera, a microphone, a biosensor, a radar, a laser scanner, or an ultrasonic sensor.

The sensing module 130 collects information about an occupant.

The camera collects image information about an occupant in the vehicle. Specifically, the image information may include at least one of a face image, an eye image, a body part image, or a whole body image of an occupant.

The camera may transmit the acquired image information to the control unit 150 or may process the image information. When the camera directly processes image information, the camera may include an image sensor and an image processing module. The image processing module may process a still or moving image obtained by the image sensor (e.g., a Complementary Metal-Oxide Semiconductor (CMOS) or a Charged Coupled Device (CCD)).

The microphone collects audio information about an occupant. The microphone may collect audio information indicating the occupant's voice, utterance, or speech. When the occupant's voice and other voices are mixed inside a vehicle, the microphone may separate and collect only audio information about the occupant.

The biosensor collects an occupant's biometric information. The biometric information may include blood pressure, blood glucose concentration, brain wave signals, heart rate, pupil information, and the like.

The radar and the ultrasonic sensor collect distance information of an occupant. The distance information includes the distance between the sensor and the occupant.

The sensing module 130 may be provided at various positions within a vehicle. For example, the camera may be provided on a dashboard or roof, and the microphone may be included on a headrest or dashboard. The biosensor may be provided on a seat. The radar and the ultrasonic sensor may be provided at various points facing a seat.

In order to obtain driving information of a vehicle, the sensing module 130 may include a corner radar, a lidar, an acceleration sensor, a yaw rate sensor, a torque measurement sensor and/or wheel speed sensor, a steering angle sensor, and the like. The sensing module 130 may further include a heading sensor, a yaw sensor, a gyro sensor, a vehicle forward/backward sensor, a wheel sensor, a vehicle body tilt sensing sensor, a battery sensor, a fuel sensor, a tire sensor, a vehicle interior temperature sensor, a vehicle interior humidity sensor, a door sensor, or the like.

The steering control device 160 may be configured to control the steering angle of a vehicle. The steering control device 160 may include a steering wheel, an actuator that is connected to the steering wheel, and a controller. The controller controls the actuator.

The braking control device 170 may be configured to control the braking of a vehicle and may include a controller that controls a brake.

The acceleration control device 180 may be configured to control engine driving or motor driving of a vehicle and may accelerate a vehicle.

The interface module 140 provides necessary information to an occupant or receives a predetermined request from the occupant.

The interface module 140 may be implemented as a device capable of sending and receiving various sensory information, such as human hearing, vision, and touch. For example, the interface module 140 may include a user setting mode (USM) device or a human-machine interaction (HMI) device.

The interface module 140 may include an input device or an output device.

The input device may be implemented as at least one physical button, a touch panel, a microphone, and/or the like, but is not limited to the present disclosure. The input device may also be implemented in other manners as long as receiving predetermined information input from an occupant is possible. According to various embodiments, the input device may be combined with the output device and implemented as a touch display or the like.

The output device may be implemented by at least one of a display device that visually provides information generated in the control unit 150, a speaker that audibly provides information produced in the vehicle, or a vibration module that tactilely provides information created in the vehicle. The output device may also be implemented in other ways that may provide an occupant with information generated in a vehicle.

The control unit 150 sets a route for postponing arrival of a vehicle at a destination based on behavior information of an occupant and an input time of the occupant.

Specifically, the control unit 150 receives destination information of an occupant and controls a vehicle so that the vehicle moves, i.e., drives or is driven, to a destination. While the vehicle is directed to the destination, the control unit 150 obtains behavior information indicating a behavior of an occupant in the vehicle by using the communication module 110 or the sensing module 130. The control unit 150 receives from the occupant, time information for postponing arrival of the vehicle at the destination via the communication module 110 or the interface module 140. The time information may include a time that is delayed from the time of arrival according to an existing route or may include a desired time of arrival. The control unit 150 determines at least one recommended route according to the behavior information and the time information and provides the at least one recommended route to an occupant. When an occupant selects the at least one recommended route, the control unit 150 sets the selected recommended route as a driving route of a vehicle. Then, the control unit 150 may control the vehicle so that the vehicle moves or drives or is driven along the set driving route.

The control unit 150 may be electrically connected to or coupled with other components and the like of the route providing apparatus. The control unit 150 may electrically control respective configurations. The control unit 150 may be an electric circuit that executes commands of software, thereby performing various data processing and calculations described below. The control unit 150 may include at least one memory storing computer-executable instructions, and one or more processors executing the computer-executable instructions to perform the route providing method. In an embodiment, the control unit 150 may be implemented by the one or more processors.

Figure 2:
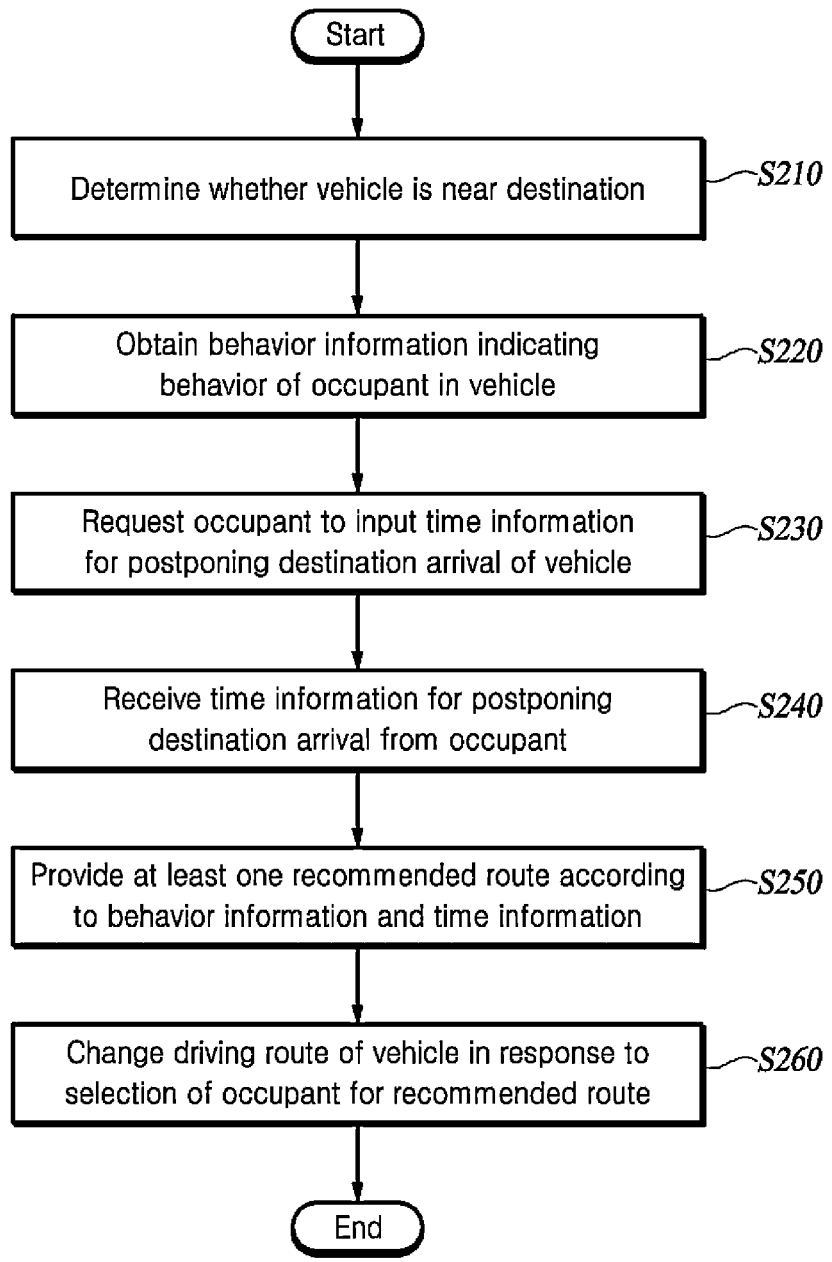
FIG. 2 is a flowchart of a route providing method according to an embodiment of the present disclosure.

FIG. 2 is a flowchart of a route providing method according to an embodiment of the present disclosure. FIG. 3 is a view showing a time information input request screen according to an embodiment of the present disclosure. FIG. 4 is a view of a table in which locations corresponding to a delay time and an occupant behavior are recorded according to an embodiment of the present disclosure.

First, a vehicle carrying an occupant receives destination information of the occupant, sets a route to a destination, and moves along the set route to the destination.

Referring to FIG. 2, the route providing apparatus determines whether a vehicle is near a destination (S210).

Even though a vehicle is far away from a destination, querying an occupant whether to postpone arrival at the destination or changing a route may worsen the user experience. Thus, the route providing apparatus determines whether the vehicle has arrived near the destination.

According to an embodiment of the present disclosure, the route providing apparatus may determine whether a vehicle is located near a destination by determining whether an expected arrival time at a destination is earlier than a desired arrival time input by an occupant.

Specifically, the route providing apparatus may receive a desired arrival time from an occupant at a departure point. In the absence of an input by an occupant, the desired arrival time may be set to an expected arrival time at a departure point. While the vehicle is moving, the route providing apparatus periodically updates the expected arrival time based on traffic information and road information to provide the occupant with the expected arrival time at a destination. If a traffic flow is smooth, the vehicle may reach the vicinity of the destination earlier than the expected arrival time determined at a departure point. In other words, when the expected arrival time is earlier than the desired arrival time, the route providing apparatus may determine that a vehicle has arrived at a location near the destination.

According to another embodiment of the present disclosure, the route providing apparatus may determine whether a vehicle is located near a destination by determining whether an expected arrival time at the destination is within a preset time range. When the expected arrival time is updated, the route providing apparatus may determine whether the vehicle is located near the destination based on whether the updated expected arrival time is within a preset time range. The preset time range may be adjusted via an input entered by an occupant.

According to another embodiment of the present disclosure, the route providing apparatus may determine whether a vehicle is located near a destination by determining whether the location of the vehicle falls within a predetermined distance range from the destination. The predetermined distance range may be adjusted by an input entered by an occupant.

Further, step S210 may be set as the trigger condition of step S220.

Then, the route providing apparatus obtains behavior information indicating a behavior of an occupant in the vehicle (S220).

In this case, the behavior information includes at least one of gaze information, motion information, posture information, or audio information of an occupant.

The route providing apparatus may obtain the gaze information of an occupant based on at least one of image information or biometric information about the occupant. The gaze information of an occupant includes gaze information including a direction of the gaze of the occupant, or a pupil position in the eyes of the occupant.

The route providing apparatus may obtain motion information of the occupant based on at least one of the image information about the occupant or the distance information of the occupant from a sensor.

The route providing apparatus may obtain posture information of an occupant based on at least one of the image information about the occupant or the distance information of the occupant from a sensor. The posture information includes information regarding whether the occupant is in a sitting posture, a lying posture, a side leaning posture, a calling posture, and a posture while using a terminal device of an occupant, or the like.

The route providing apparatus may obtain audio information including voice, utterance, or speech of an occupant.

The route providing apparatus may further classify an occupant's behavior according to a preset category based on the behavior information. A category relating to a behavior of an occupant may include a forward gaze, a lateral gaze, viewing of media content, listening to music, playing of a game, terminal device gaze, reading a book, a conversation, a video call, sleeping, or the like. In an example, the route providing apparatus may determine that an occupant is performing an action of lateral gaze based on the gaze information of the occupant. In another example, the route providing apparatus may determine that an occupant is viewing media content using a terminal device or an AVN device based on at least one of gaze information or posture information of the occupant. In another example, the route providing apparatus may determine that an occupant is reading a book based on at least one among gaze information, posture information, or motion information. In another example, the route providing apparatus may determine that an occupant is having a conversation based on audio information of the occupant. In another example, the route providing apparatus may determine that an occupant is in a sleeping state based on at least one of gaze information, biometric information, or posture information of the occupant.

Further, the route providing apparatus may perform determining whether an occupant desires to postpone arrival at a destination based on behavior information of the occupant. If it is determined that the occupant is performing one of the preset actions, the route providing apparatus may determine that the occupant desires to postpone arrival at a destination. For example, if the occupant is enjoying media content, the route providing apparatus may determine that the occupant desires to postpone arrival at a destination. In another example, if the occupant is sleeping, the route providing apparatus may determine that the occupant desires to postpone arrival at a destination.

Otherwise, the route providing apparatus may request an occupant whether to postpone destination arrival, together with how long to postpone the arrival time by via step S230.

The route providing apparatus requests an occupant to input time information for postponing destination arrival of the vehicle (S230).

According to an embodiment of the present disclosure, the route providing apparatus may determine additional time candidates based on behavior information and request an input of additional time from an occupant. In this case, requesting input of additional time includes additional time candidates.

Values of recommended time candidates may be pre-stored corresponding to behavior information of an occupant. For example, recommended time candidates corresponding to a media content viewing behavior of an occupant may be stored as 5 minutes and 25 minutes. In another example, recommended time candidates corresponding to an occupant conversation may be stored as 10 minutes, 15 minutes, and 20 minutes.

Otherwise, the route providing apparatus may collect additional information about behavior information of an occupant. The route providing apparatus may further determine additional time candidates based on the additional information. For example, when the occupant is viewing media content, the route providing apparatus collects information about a remaining playback time of the media content from a server or an occupant terminal device. The route providing apparatus may determine additional time candidates based on a remaining playback time.

Additional time candidates may include at least one of additional time candidates according to the forward gaze of an occupant, additional time candidates according to a lateral gaze, additional time candidates according to viewing of media content, additional time candidates according to listening to music, additional time candidates according to playing a game, additional time candidates according to a terminal device gaze, additional time candidates according to reading a book, additional time candidates according to a conversation, or additional time candidates according to a video call.

The route providing apparatus may include additional time candidates according to behavior information of an occupant in an additional time input request and may request the occupant to select the additional time candidates.

The route providing apparatus may further provide an interface by which an occupant may directly input time information for postponing destination arrival in addition to the additional time candidates.

Referring to FIG. 3, an example of a screen for a request for input of an additional time is shown.

The route providing apparatus receives time information for postponing destination arrival from an occupant (S240).

The occupant may select one of additional time candidates or directly enter time information in response to a request for input of an additional time.

The time information entered may include a time to be added or may include a desired arrival point of time.

The route providing apparatus provides at least one recommended route according to the behavior information and the time information (S250).

To this end, the route providing apparatus determines at least one recommended route based on behavior information of an occupant and input time information. The recommended route is a route that allows a vehicle to arrive at a destination as late as the input time information compared to an existing route and passes through an area or a point according to the behavior information of the occupant.

According to an embodiment of the present disclosure, areas or points may be preset corresponding to behavior information and time information. In other words, a recommended route may pass through one of pre-stored areas or points corresponding to behavior information and time information. If either an occupant's behavior information or time information about arrival postponement is different, recommended routes may also differ.

Referring to FIG. 4, a table in which preset areas or points corresponding to behavior information of an occupant and input time information are recorded is shown.

In an example, if an occupant takes a first action, e.g., a forward gaze, and inputs a short time of less than 20 minutes as an additional time for postponing arrival, the route providing apparatus may provide a route passing through the urban area as a recommended route.

In another example, if an occupant takes a second action, e.g., a vehicle display gaze for content viewing, and inputs a short time of less than 20 minutes as an additional time for delay of arrival, the route providing apparatus may provide a first recommended route passing through the urban area and a second recommended route passing through a free stop point. The free stop point may be a free parking lot. The second recommended route may include the vehicle stopping at the free stop point for as long as the additional time for postponing arrival.

In another example, if an occupant is taking a third action, e.g., reading a book, and inputs a long time of 20 minutes or more as an additional time, the route providing apparatus may provide a third recommended route passing through a paid stop point and a fourth recommended route passing through a charging station point. The paid stop point may be a paid parking lot. The third recommended route may include the vehicle stopping at the paid stop point for as long as the additional time for postponing arrival.

Based on a battery charging state of the vehicle or a current time, the route providing apparatus may additionally provide a route passing through the charging station point or a route passing through a restaurant point.

The route providing apparatus may request a selection from an occupant for at least one recommended route.

The route providing apparatus changes a driving route of the vehicle in response to the selection of an occupant for the recommended route (S260).

The route providing apparatus may control the vehicle such that the vehicle moves or is driven along a changed driving route.

Further, when there is no response from an occupant to a recommended route, the route providing apparatus may determine a driving route of the vehicle from at least one recommended route based on a priority regarding preset areas or points.

In the above example, when an occupant prefers the free stop point over the urban area, the route providing apparatus may determine the second recommended route from among the first recommended route and the second recommended route as a driving route of the vehicle.

A priority regarding areas or points may be preset by a manufacturer or a user. The priority regarding areas or points may be adjusted later.

Thus, in accordance with the route providing method according to an embodiment of the present disclosure, a vehicle may not only transport an occupant to a destination in a quick time but also assist the occupant in the vehicle to perform work or enjoy hobbies. If arrival at a destination is faster than an expected arrival time at a departure point, an occupant may wait comfortably or perform work in a vehicle rather than exiting the vehicle. Accordingly, the user experience of the occupant in the vehicle may be improved.

Figure 5A:
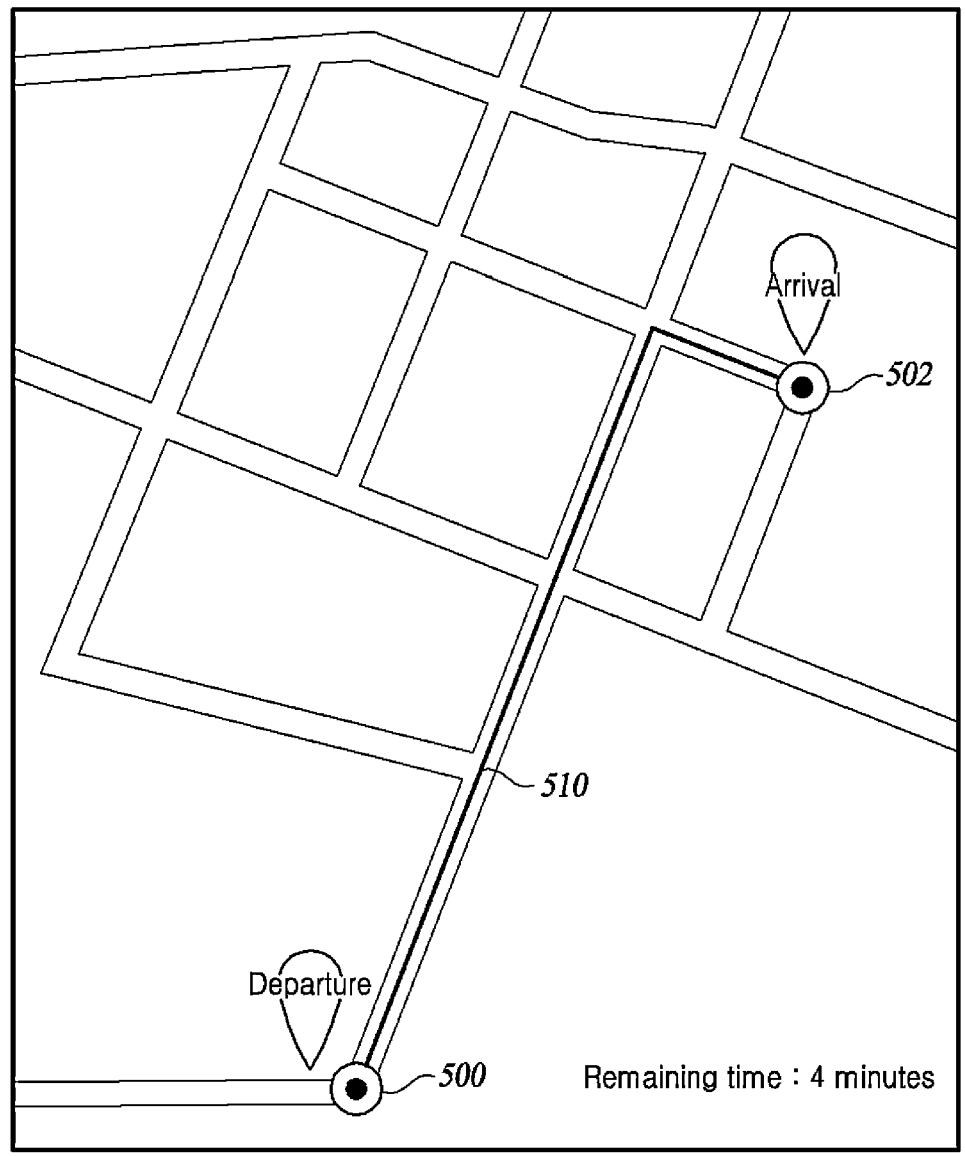
FIGS. 5A, 5B, and 5C are views of routing screens according to an embodiment of the present disclosure.
Figure 5B:
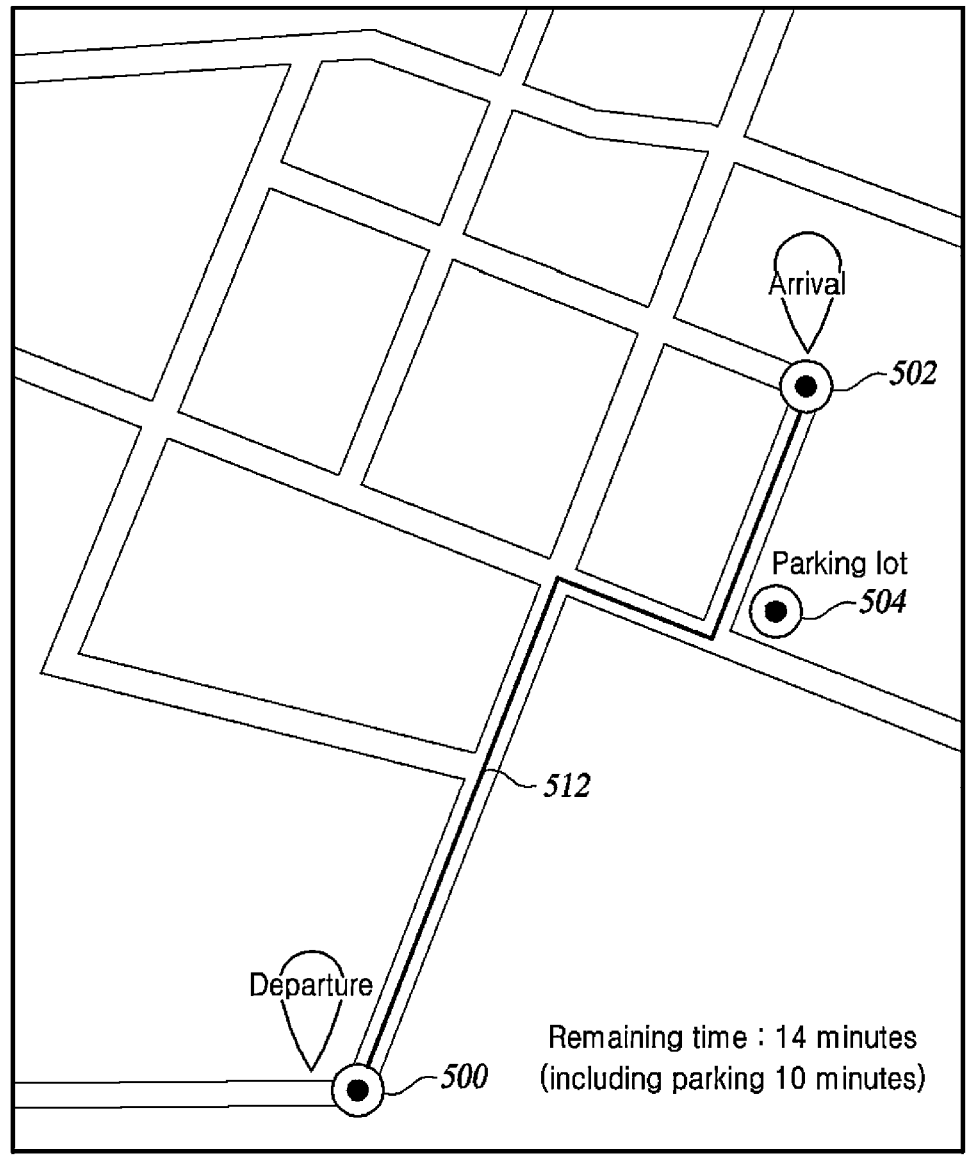
Figure 5C:
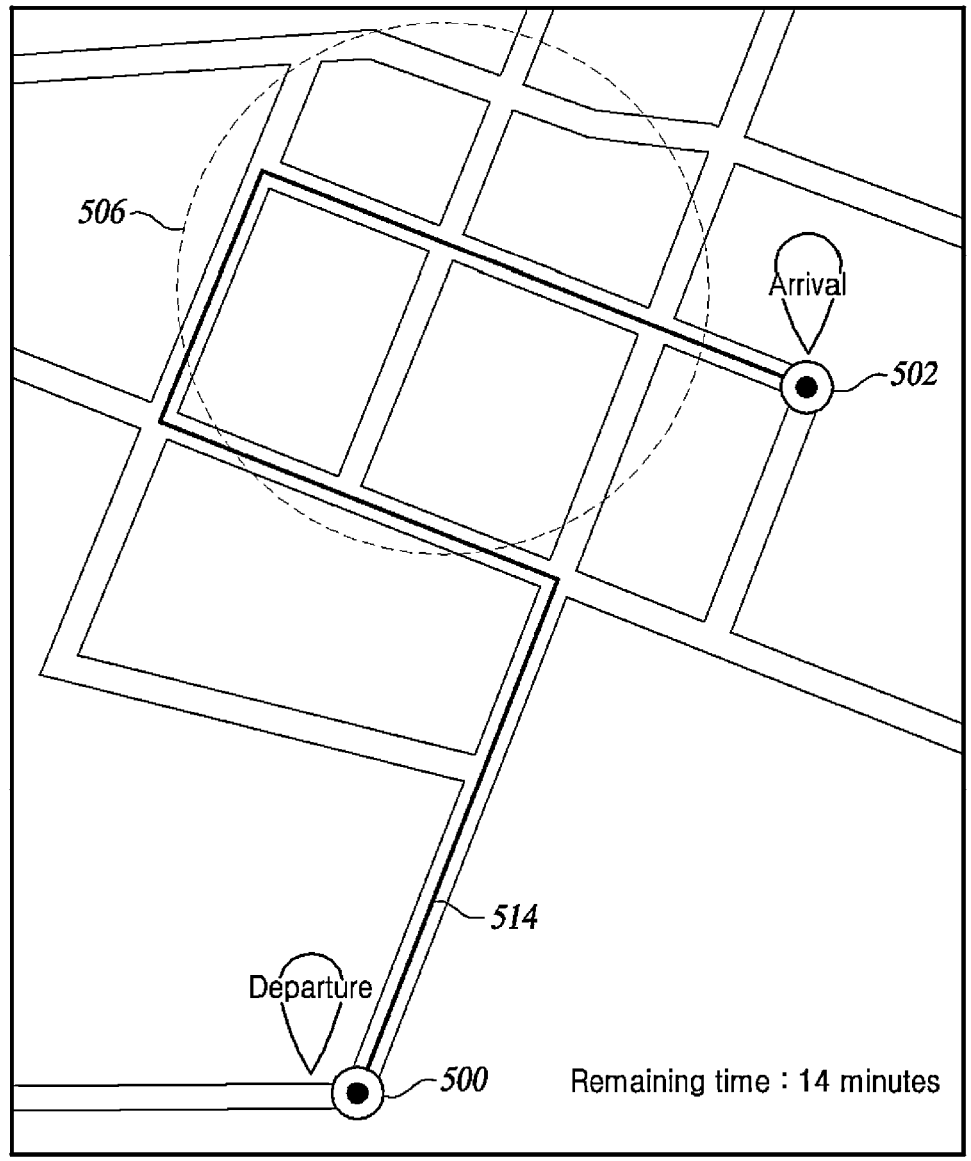

FIGS. 5A, 5B, and 5C are views of routing screens according to an embodiment of the present disclosure.

Referring to FIG. 5A, a departure point 500, a destination 502, and a driving route 510 are illustrated.

A vehicle sets a driving route 510 between a departure point 500 and a destination 502, satisfying the shortest distance condition at the departure point 500. The vehicle is driven along the driving route 510. The time taken for the vehicle to arrive at the destination 502 along the driving route 510 is 4 minutes.

At this time, the time at which a vehicle arrives at the destination 502 may need to be postponed. For example, while an occupant is viewing media content using a terminal device of an occupant in the vehicle, the remaining playback time of the media content may be 10 minutes. The route providing apparatus may receive time information to postpone the arrival by 10 minutes from the occupant.

The route providing apparatus according to an embodiment of the present disclosure may provide a recommended route based on behavior information of an occupant in the vehicle and time information input from the occupant for postponing the arrival. The route providing apparatus may provide a plurality of recommended routes corresponding to behavior information and time information.

Referring to FIG. 5B, a parking lot 504 and a first recommended route 512 are further illustrated.

The route providing apparatus may provide a route with a short driving distance of a vehicle so that an occupant can view the remaining media content in the vehicle. Specifically, the route providing apparatus may provide the occupant with the first recommended route 512 passing through the parking lot 504, considering that the occupant is taking an action of terminal device gaze and that the time required to postpone arrival is 10 minutes. A vehicle along the first recommended route 512 may stop at the parking lot 504 for 10 minutes or less.

Referring to FIG. 5C, an urban area 506, and a second recommended route 514 are shown.

The route providing apparatus may provide a simple alternative route so that an occupant is able to view the remaining media content in the vehicle. Specifically, the route providing apparatus may provide the second recommended route 514 passing through the urban area 506, considering that the occupant is taking an action of terminal device gaze and that the time required to postpone the arrival is 10 minutes.

Further, the route providing apparatus may request an occupant to select either the first recommended route 512 or the second recommended route 514. The route providing apparatus changes a driving route of the vehicle to a route according to a selection of the occupant. In the absence of a response from an occupant, the route providing apparatus may determine either the first recommended route 512 or the second recommended route 514 as a driving route based on a preset priority on the parking lot 504 and the urban area 506.

As described above, according to an embodiment of the present disclosure, the user experience can be improved by postponing arrival of the vehicle to a destination so that the behavior of an occupant may be maintained when the location of the vehicle is near a destination.

The effects of the present disclosure are not limited to the effects mentioned above. Other effects not mentioned should be clearly understood by a person of ordinary skill in the art from the foregoing description.

Various implementations of systems and techniques described herein may be implemented in a digital electronic circuit, an integrated circuit, a field programmable gate array (FPGA), an application specific integrated circuit (ASIC), computer hardware, firmware, software, and/or a combination thereof. These various implementations may include being implemented with one or more computer programs executable on a programmable system. The programmable system includes at least one programmable processor (which may be a special purpose processor or a general purpose processor) coupled to receive data and instructions from and to transmit data or instructions to a storage system, at least one input device, and at least one output device. Computer programs (also known as programs, software, software applications, or codes) include computer-executable instructions for a programmable processor and are stored on a "computer-readable recording medium".

The computer-readable recording medium includes all kinds of non-transitory recording devices in which data readable by a computer system is stored. Such a computer-readable recording medium may be a non-volatile or non-transitory medium such as a ROM, a CD-ROM, a magnetic tape, a floppy disk, a memory card, a hard disk, a magneto-optical disk, or a storage device, and may further include a transitory medium such as a data transmission medium. In addition, the computer-readable recording medium may be distributed over network-connected computer systems, and a computer readable code may be stored and executed in a distributed manner.

Although each process is described as being executed sequentially in the flowchart/timing diagram of the present disclosure, the technical idea of the disclosure is described via the disclosed embodiments. In other words, the flowcharts/timing diagrams are not limited to a chronological order, as those of ordinary skill in the art should be able to apply various modifications and variations to the order described in the flowchart/timing diagram or to execute one or more of the respective processes in parallel without departing from essential characteristics of the embodiments of the present disclosure.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A route providing method for postponing arrival of a vehicle at a destination, the route providing method comprising:
    obtaining, by a processor, behavior information indicating a behavior of an occupant in the vehicle;
    receiving, by the processor from the occupant, time information for postponing arrival of the vehicle at the destination, wherein the receiving is triggered based on whether a current location of the vehicle is near the destination;
    providing, by the processor, at least one recommended route according to the behavior information and the time information;
    changing, by the processor, a driving route of the vehicle based on the at least one recommended route; and
    controlling, by the processor, the vehicle to move along the changed driving route,
    wherein receiving the time information includes
        determining, by the processor, whether the current location of the vehicle is near the destination based on whether an expected arrival time at the destination is earlier than a desired arrival time input by the occupant, whether an expected arrival time at the destination is within a preset range, or whether the current location of the vehicle is within a predetermined range from the destination, and
        querying, by the processor, in response to determining that the expected arrival time is earlier than the desired arrival time input, that the expected arrival time is within the preset range or that the current location of the vehicle is within the predetermined range from the destination, the occupant for at least one of whether to postpone the arrival of the vehicle or how long to postpone the arrival of the vehicle.

2. The route providing method of claim 1, wherein the behavior information comprises at least one of gaze information, motion information, posture information, or audio information of the occupant.

3. The route providing method of claim 1, wherein receiving the time information comprises:
    determining, by the processor, additional time candidates based on the behavior information; and
    requesting, by the processor, input of an additional time from the occupant, the request including the additional time candidates, wherein the request provides the occupant with options to select from the additional time candidates automatically determined based on the behavior of the occupant, and an option to directly enter an additional time that is different from the additional time candidates.

4. The route providing method of claim 3, wherein the additional time candidates comprise at least one of additional time candidates according to a forward gaze, additional time candidates according to a lateral gaze, additional time candidates according to a viewing of media content, additional time candidates according to a listening to music, additional time candidates according to a playing of a game, additional time candidates according to a terminal device gaze, additional time candidates according to a reading of a book, additional time candidates according to a conversation, or additional time candidates according to a video call of the occupant.

5. The route providing method of claim 1, wherein the at least one recommended route passes through one of preset areas or points corresponding to the behavior information and the time information.

6. The route providing method of claim 1, wherein changing the driving route comprises:
    changing the driving route of the vehicle in response to a selection of the occupant for the at least one recommended route.

7. The route providing method of claim 5, further comprising determining a driving route of the vehicle from the at least one recommended route based on a priority regarding the preset areas or points, in the absence of a response of the occupant to the at least one recommended route.

8. The route providing method of claim 1, further comprising determining the at least one recommended route, wherein the at least one recommended route includes either a paid stop point near the destination or a free stop point near the destination based on the time information for postponing arrival of the vehicle by the occupant.

9. A route providing apparatus for postponing arrival of a vehicle at a destination, the route providing apparatus comprising:
    at least one memory storing computer-executable instructions; and
    at least one processor, wherein the at least one processor is configured to execute the computer-executable instructions to
obtain behavior information indicating a behavior of an occupant in the vehicle,
receive, from the occupant, time information for postponing arrival of the vehicle at the destination,
provide at least one recommended route according to the behavior information and the time information,
change a driving route of the vehicle based on the at least one recommended route,
control the vehicle to move along the changed driving route,
trigger receiving of the time information based on whether a current location of the vehicle is within a predefined distance from the destination,
determine whether the current location of the vehicle is near the destination based on whether an expected arrival time at the destination is earlier than a desired arrival time input by the occupant, whether an expected arrival time at the destination is within a preset range, or whether the current location of the vehicle is within a predetermined range from the destination, and
query, in response to determining that the expected arrival time is earlier than the desired arrival time input, that the expected arrival time is within the preset range, or that the current location of the vehicle is within the predetermined range from the destination, the occupant for at least one of whether to postpone the arrival of the vehicle or how long to postpone the arrival of the vehicle.

10. The route providing apparatus of claim 9, wherein the behavior information comprises at least one of gaze information, motion information, posture information, or audio information of the occupant.

11. The route providing apparatus of claim 9, wherein the at least one processor is configured to:
determine additional time candidates based on the behavior information; and
request an input of an additional time from the occupant, the request including the additional time candidates,
wherein the request provides the occupant with options to select from the additional time candidates automatically determined based on the behavior of the occupant, and an option to directly enter an additional time that is different from the additional time candidates.

12. The route providing apparatus of claim 11, wherein the additional time candidates comprise at least one of additional time candidates according to a forward gaze, additional time candidates according to a lateral gaze, additional time candidates according to a viewing of media content, additional time candidates according to a listening to music, additional time candidates according to a playing of a game, additional time candidates according to a terminal device gaze, additional time candidates according to a reading of a book, additional time candidates according to a conversation, or additional time candidates according to a video call of the occupant.

13. The route providing apparatus of claim 9, wherein the at least one recommended route passes through one of preset areas or points corresponding to the behavior information and the time information.

14. The route providing apparatus of claim 9, wherein the at least one processor is configured to change the driving route of the vehicle in response to a selection of the occupant for the at least one recommended route.

15. The route providing apparatus of claim 13, wherein the at least one processor is configured to determine a driving route of the vehicle from the at least one recommended route based on a priority regarding the preset areas or points, in the absence of a response of the occupant to the at least one recommended route.

16. The route providing apparatus of claim 9,
wherein the at least one processor is configured to determine the at least one recommended route, and
wherein the at least one recommended route includes either a paid stop point near the destination or a free stop point near the destination based on the time information for postponing arrival of the vehicle by the occupant.

17. A route providing method for postponing arrival of a vehicle at a destination, the route providing method comprising:
obtaining, by a processor, behavior information indicating a behavior of an occupant in the vehicle;
receiving, by the processor from the occupant, time information for postponing arrival of the vehicle at the destination, wherein receiving the time information for postponing arrival is triggered based on whether a current location of the vehicle is near the destination;
providing, by the processor, at least one recommended route according to the behavior information and the time information;
changing, by the processor, a driving route of the vehicle based on the at least one recommended route; and
controlling, by the processor, the vehicle to move along the changed driving route,
wherein receiving the time information comprises:
determining, by the processor, additional time candidates based on the behavior information; and
requesting, by the processor, input of an additional time from the occupant, the request including the additional time candidates, wherein the request provides the occupant with options to select from the additional time candidates automatically determined based on the behavior of the occupant, and an option to directly enter an additional time that is different from the additional time candidates.

* * * * *